United States Patent
Ghanma et al.

(10) Patent No.: US 12,143,366 B2
(45) Date of Patent: Nov. 12, 2024

(54) CONTROLLED-ACCESS ENCRYPTED-COMMUNICATIONS SYSTEM

(71) Applicants: Tariq Tony Ghanma, Santa Clara, CA (US); Alexandru Lazarovici, Pleasanton, CA (US); Fawad Ahsan, Satellite Town Rawalpindi (PK)

(72) Inventors: Tariq Tony Ghanma, Santa Clara, CA (US); Alexandru Lazarovici, Pleasanton, CA (US); Fawad Ahsan, Satellite Town Rawalpindi (PK)

(*) Notice: Subject to any disclaimer, the term of this patent is extended or adjusted under 35 U.S.C. 154(b) by 329 days.

(21) Appl. No.: 17/896,806

(22) Filed: Aug. 26, 2022

(65) Prior Publication Data

US 2024/0073187 A1   Feb. 29, 2024

(51) Int. Cl.
  *H04L 9/40* (2022.01)
  *H04L 9/08* (2006.01)
  *H04L 9/32* (2006.01)

(52) U.S. Cl.
  CPC ........ *H04L 63/0272* (2013.01); *H04L 9/0825* (2013.01); *H04L 9/0841* (2013.01); *H04L 9/0866* (2013.01); *H04L 9/3226* (2013.01)

(58) Field of Classification Search
  CPC . H04L 63/0272; H04L 9/0825; H04L 9/0841; H04L 9/0866; H04L 9/3226; H04L 9/40
  See application file for complete search history.

(56) References Cited

U.S. PATENT DOCUMENTS

| | | | |
|---|---|---|---|
| 9,088,546 B2 | 7/2015 | Tjahjono et al. | |
| 9,350,710 B2 | 4/2016 | Herle et al. | |
| 9,455,958 B1 | 9/2016 | Walter et al. | |
| 9,485,141 B1 | 11/2016 | Wang | |
| 9,609,519 B2 | 3/2017 | Chen | |
| 9,667,534 B2 | 5/2017 | Haney | |
| 9,780,965 B2 | 10/2017 | Huynh Van et al. | |
| 9,832,169 B2 | 11/2017 | Border et al. | |
| 9,942,787 B1 | 4/2018 | Tillotson | |
| 10,142,328 B1* | 11/2018 | Barrasso | H04L 63/083 |
| 10,505,904 B2 | 12/2019 | Hoy et al. | |
| 10,616,180 B2 | 4/2020 | Chanak et al. | |
| 10,666,606 B2 | 5/2020 | Voegele et al. | |
| 10,728,110 B2 | 7/2020 | Flavel et al. | |
| 11,070,473 B2 | 7/2021 | Williams et al. | |
| 11,258,765 B2 | 2/2022 | Palojarvi et al. | |
| 2002/0095589 A1* | 7/2002 | Keech | H04L 67/06 713/189 |
| 2010/0241857 A1* | 9/2010 | Okude | H04L 9/08 713/168 |
| 2013/0268740 A1* | 10/2013 | Holt | G06F 21/00 711/163 |
| 2013/0305057 A1* | 11/2013 | Greco | G06F 21/62 713/189 |

(Continued)

*Primary Examiner* — Darren B Schwartz
(74) *Attorney, Agent, or Firm* — Robert Brownstein (57) ABSTRACT

The invention is a method of use for a VPN, customized via programming, that controls access without requiring any personal user information, and conveys only files encrypted using Diffie-Hellman AES-256-GCM encryption processes. Conveyed files are stored only in encrypted form and can only be displayed in real time by a user, and once viewed, only the encrypted file remains. The method also includes a means of end-to-end file deletion that leaves no remnants of the deleted file behind.

3 Claims, 12 Drawing Sheets

(56) References Cited

U.S. PATENT DOCUMENTS

| | | | |
|---|---|---|---|
| 2014/0281506 A1* | 9/2014 | Redberg | H04L 63/0442 |
| | | | 713/159 |
| 2019/0356634 A1 | 11/2019 | Foxhoven et al. | |
| 2020/0252375 A1 | 8/2020 | Chen et al. | |
| 2022/0083685 A1* | 3/2022 | Reyes | G06F 21/602 |

* cited by examiner

CONTROLLED-ACCESS ENCRYPTED-COMMUNICATIONS SYSTEM

TECHNICAL FIELD

The invention is a system for secure communications between two parties.

BACKGROUND OF INVENTION

Current Internet-related communications systems typically convey text, audio and/or video content in non-encrypted form. Thus, by capturing content being conveyed, that content is in a form that can be read, listened to, or displayed in its original form.

Furthermore, the means of communications typically involve divulging information about the sender, such as phone number, email address, or credit-card number such that with available technology it is possible to not only read, hear or see what is being conveyed, but to also identify who is sending and who is receiving that conveyed content.

When one person sends another person a text, audio and/or video file, it is assumed that the content is private and only the two parties involved have access to it. But, in non-encrypted form the sent and received files, when stored, can be captured using well-known "hacking" techniques. An entire conversation comprising multiple emails, recordings and/or graphics can thus be captured, reviewed and exposed.

In the past, when networks comprised wired nodes belonging to trusted parties, tapping into those networks required physically intervening. Today's wired and wireless networking poses no such limitations. So called "virtual private networks," or VPNs attempt to emulate a private network by controlling how peer-to-peer communications over the Internet is orchestrated and by encrypting all content to be conveyed. However, access to these VPNs typically involves divulging personal information; and encrypted and/or non-encrypted files to be conveyed may be stored in ways that make them vulnerable to capture by hacking.

The ways in which messages are conveyed via Internet are to a large extent dictated by accepted protocols. The ways in which Internet-accessing systems operate in the Internet context are also dictated by accepted standards and protocols. Therefore, any attempt to reduce exposure of personal information and file content essentially must be done prior to accessing and conveying content via the Internet. It must be done by how the Internet-accessing systems, themselves, interact with users and content both before and after Internet message conveyance.

BRIEF DESCRIPTION OF INVENTION

The invention herein disclosed and claimed is an Internet-accessing system whose customized programming establishes a method of use that controls access without requiring personal information, conveys only encrypted content without requiring auxiliary content storage, and ensures that only encrypted content can be stored on the sending and receiving ends when such content is not being reviewed in real time. In addition, the method includes a means for deleting conveyed content, on both ends, as well as records of conveyance. In essence, a conversation may be completely deleted where the sending party believes there is a privacy threat. A VPN thus customized through programming is referred to as a customized virtual-private network or CVPN.

DETAILED DESCRIPTION OF INVENTION

Most email messages are conveyed from sender to receiver in original form and preserving a record of originator identification and destination identification. From a privacy perspective, then, there is essentially no protection of conveyance information and what was conveyed. Users who are concerned about protecting conveyance information and content may seek to use a virtual private network (VPN) that creates a semblance of a private network despite using a public network for conveyance by encrypting content conveyed and perhaps originator identification. Where VPN use is restricted to authorized users, and each user has a client application, originator and destination identification may also be obscured. What is typically not protected is the personal information required to establish access authorization. Thus, it may be possible to use VPN data to expose an originator's or recipient's personal information, such as telephone number, email address, name, and the like. That presents somewhat of a compromise when the objective is to secure privacy.

The invention herein disclosed and claimed is a method of use of a VPN that adds more privacy security to a conventional VPN. The underlying Internet-accessing VPN system is not novel in terms of hardware and interface aspects. Any system that accesses the Internet and supports content transfer between client devices must comply with accepted Internet standards and protocols. Therefore, what occurs on the Internet is not novel. But, a VPN can be programmed, or customized, so as to enhance privacy security. It is the programmed steps and their outcome which may constitute novelty. As such, by definition, a customized virtual private network (CVPN) may be established by novel programming of a VPN.

For example, a VPN may require a user seeking its access to provide at least one form of personal identification, such as name, phone number, credit-card number, or email address. Therefore, in authorizing access, the VPN associates that access with at least one piece of personal identification. That could create a privacy compromise allowing a transaction to be associated with a user.

The VPN, however, could be programmed and customized (e.g. CVPN) to enable access without requiring any personal identification. For example, it may take note of the system used to seek access, and require the user to create a user ID and personal-identification number (PIN) but not require anything linking back to the person using the system. Upon a request for access, the programming customized VPN (CVPN) requests the user create an ID and PIN. Once done, it sends the user a unique user access number (UAN) that contains multiple digits. That UAN is associated with ID and PIN only and has no reference at all to personal information. With a unique UAN, each user can gain access to the CVPN.

If users A and B wish to use the CVPN to convey messages (e.g. text, audio and/or video), both A and B must seek access to the CVPN, both A and B must provide their own unique ID and PIN information, and each will receive a unique UAN. The UAN for A will be different than the UAN for B, and no other user will have either the UAN of A or B. Going forward, users A and B may now use their respective UANs to seek and gain access to the CVPN.

If A wishes to send a private secure message to B, A must know UAN A and UAN B. Using UAN A, A gains access to the CVPN, and using UAN A and UAN B, it requests a communications path between the two users. The CVPN using conventional protocols and processes will establish that communication path if both users A and B are online. It the message is audio or video, the CVPN sets up a peer-to-peer communications path. For text messages, the communications is store and forward, that is, it is not a peer-to-peer communications path. If user A is sending the text message, and user B is not online, A's device will have encrypted the message and the CVPN will have temporarily stored only that encrypted message. Once user B is online, the CVPN will convey the encrypted message to B, delete it from any CVPN storage means, and provide a delivery message to user A.

If the message is not a text message but, rather, a voice or video message, then both users A and B would have to be simultaneously online for the peer-to-peer communications link to be established. If user B is not online, user A will receive a message to that effect, and no files will be conveyed. In essence, the file that user A has encrypted in advance of conveyance will remain on user A's device and is temporarily stored in the CVPN infrastructure. Once user B is online, the CVPN will convey the stored, encrypted message to B, delete it from any CVPN storage means, and provide a delivery message to user A.

All files prior to conveyance must be encrypted by the sending user. The CVPN application on A's device makes use of Diffie-Hellman encryption and key-exchange method (i.e. AES-256-GCM). That is, user A's device mathematically combines A's secret private key and B's public key (previously conveyed); and user B's device mathematically combines B's secret private key and A's public key (previously conveyed). The resulting combination is identical on both ends and is used to encrypt the file to be conveyed.

Upon receipt of that file by user B, it may be decrypted using B's secret key. It may also be decrypted on user A's end using A's secret key. Encrypting the file, again, on user A's end uses only A's secret key; and doing so on B's end uses only B's secret key. Thus, the encrypted files prepared after the conveyed encrypted file has been decrypted will be different on each end. A's secret key will not decrypt B's encrypted file, and vice versa.

To reiterate, an original file on user A's end is encrypted using the aforementioned Diffie-Hellman encryption, AES-256-GCM, involving A's secret private key mathematically combined with B's public key. That conveyed encrypted file is received by user B and may be decrypted using B's secret key. The decrypted file may be displayed or listened to after it has been decrypted, but only the Diffie-Hellman AES-256-GCM encrypted file remains stored on B's device once it has been viewed. The original form of the message is therefore only available in real-time during viewing or listening. After, the original form is trashed and only the encrypted file remains. User B may encrypt that conveyed encrypted file using only B's secret key; user A may encrypt that Diffie-Hellman AES-256-GCM encrypted file using A's secret key. Once done, A's file cannot be decrypted by anyone but A; and B's file cannot be decrypted by anyone but B. It is important to note that though the Diffie-Hellman encryption and key-exchange method key that is derived from A's secret private key and B's public, and B's private key and A's public key, are identical, neither user A nor user B can derive the other party's private key from that combinational key.

Consequently, the only time a message sent by A to B is vulnerable to being hacked in original form is during the act of reviewing or listening to it. Once done, the original disappears. Of course, B can review it, again, later, but only after B's CVPN app has decrypted the stored file allowing it to be reviewed or to be heard. The original form is never preserved after being reviewed.

For additional privacy security, the encrypted file conveyed by A to B is stored on A's device using A's private secret key and stored on B's device using B's private secret key. Therefore, if someone captured A's encrypted file and tried to decrypt it using B's key it would fail. The same is true for trying to decrypt B's file using A's key. The conveyed encrypted files are encrypted through the same secret key generated from the Diffie-Hellman key-exchange method so the secret keys will be identical on both ends and the conveyed files can be encrypted or decrypted using the same keys on both ends.

At this point, the CVPN has enabled A to communicate with B and to convey an encrypted file to B. Unless B is actively reviewing that file, it remains in B's device as an encrypted file.

The CVPN also supports an end-to-end delete function whereby A, if for some reason, wants to delete a sent file, or wants to delete all sent files exchanged between A and B, A can invoke a delete function to do so.

The delete request is conveyed peer-to-peer. Once received, the following actions do not require Internet access. On A's device, the encrypted file or files that were sent to B is/are each overwritten by a so-called dummy file of random characters having no meaning but serving to eliminate the encrypted contents of the stored file. The same process occurs on B's device. That is, one or more files exchanged with A are overwritten by dummy files.

When this step has completed, A's device will have a dummy file or files that replaced A's encrypted file or files; and B's device will have a dummy file or files that replaced B's encrypted file or files.

The final step is carrying out the delete function is to delete the dummy file or files on A's device and B's device. Typically, when a file is deleted, it is the index to the file that is deleted but the content remains more-or-less intact unless overwritten. In this case, on both A's and B's devices, the only content that remains is dummy-file content. The original encrypted content was eliminated during the overwriting step.

The CVPN may also be programmed such that an entire conversation between A and B can be deleted wherein the files are overwritten and deleted, as described above, and all conveyance information (origination address, destination address, payload size, and the like) are also replaced and deleted. In that case, not only are the files that were exchanged deleted, but all conveyance information was deleted, as well. Once done, there is nothing to reveal that the conversation between A and B has taken place.

The method steps claimed are those that could be supported by a CVPN. The CVPN could comprise at least one server with storage system and at least one database. The device client applications would work hand-in-glove with the CVPN. The encryption could be done on the device, alone, or augmented by the CVPN. During encryption interactions, only the device and CVPN are involved with the Internet providing a communications path only.

The method invention assumes a VPN capable of being programmatically customized requiring no novel hardware or interfaces. The software and firmware that support the method of use are assumed to be installed in both CVPN and each device.

The following figures are included to help distinguish how the underlying systems support the method steps.

Figure 1:
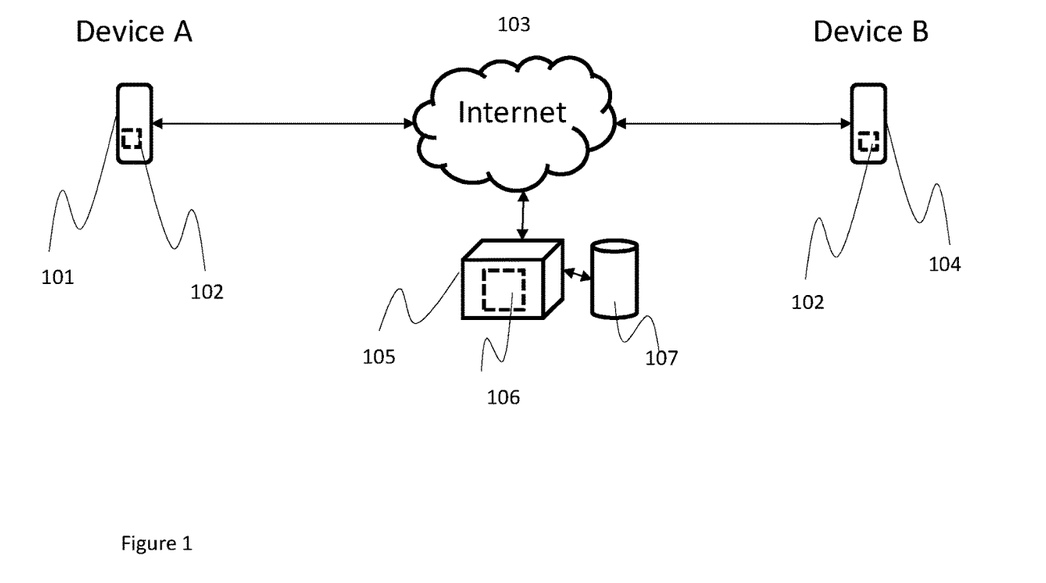
FIG. 1 depicts a CVPN for communications between parties A and B.

In FIG. 1, devices A (101) and B (104) are accessing the Internet (103). Also accessing the Internet are CVPN server (105), with its customized programming (106) and an associated database (107). Device A contains the client application for the CVPN (102) as does device B.

Figure 2:
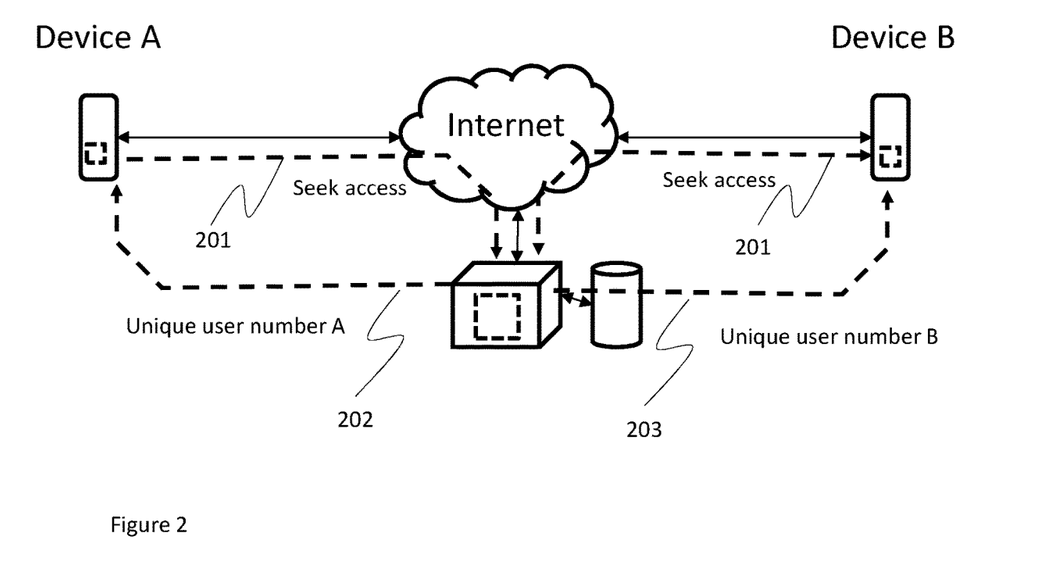
FIG. 2 illustrates how parties A and B seek access to the CVPN.

As shown in FIG. 2, using device A, user A accesses the installed CVPN application on A's device and issues over the Internet a "seek access" request (201). The CVPN responds by requesting that user A first choose an ID and PIN, and by checking its database, ensures that both are unique. Then, the CVPN, via the Internet link, conveys a multiple-digit UAN to user A which is associated with user A's selected ID and PIN and used for communications access (202). Similarly, using device B, user B performs the seek-access step (201), provides a unique ID and PIN, and receives a UAN from the CVPN Then, the CVPN, via the Internet link, conveys a multiple-digit UAN to user B which is associated with user B's selected ID and PIN and used for communications access (203). The UAN received by A (UAN A) will be different than that received by B (UAN B), and will be different than any other users' UAN based on database comparisons.

Figure 3:
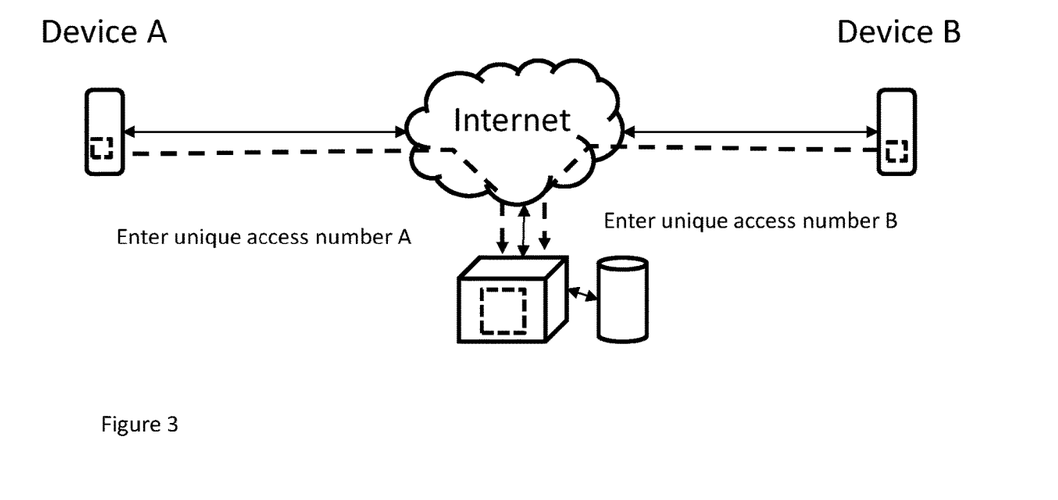
FIG. 3 illustrates how parties A and B each gain access to the CVPN.

As shown in FIG. 3, device A's user accesses the CVPN using its client application and enters the UAN it received earlier (e.g. UAN A). Device B's user does the same as device A's user but enters UAN B. Again, the UANs are different and unique to A and B. A's user has requested a peer-to-peer connection with B's user, as well, by entering UAN B.

Figure 4:
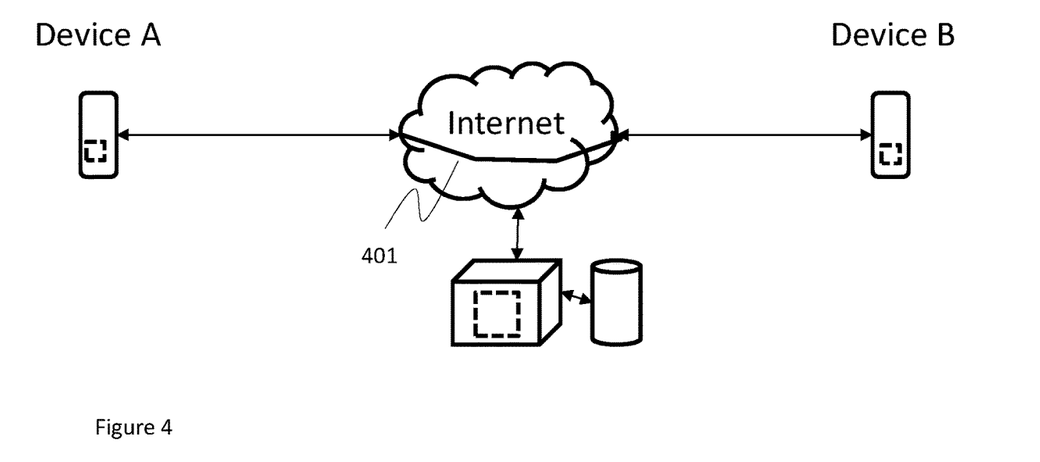
FIG. 4 illustrates how after gaining access, the CVPN establishes peer-to-peer communications between parties A and B.

As shown in FIG. 4, the CVPN validates the UANs received from user A and user B and establishes a communications path (401) if both users are online. If, for example, B is not online, then the CVPN cannot establish a communications path and simply messages user A to let user A know that user B is unavailable.

Figure 5A:
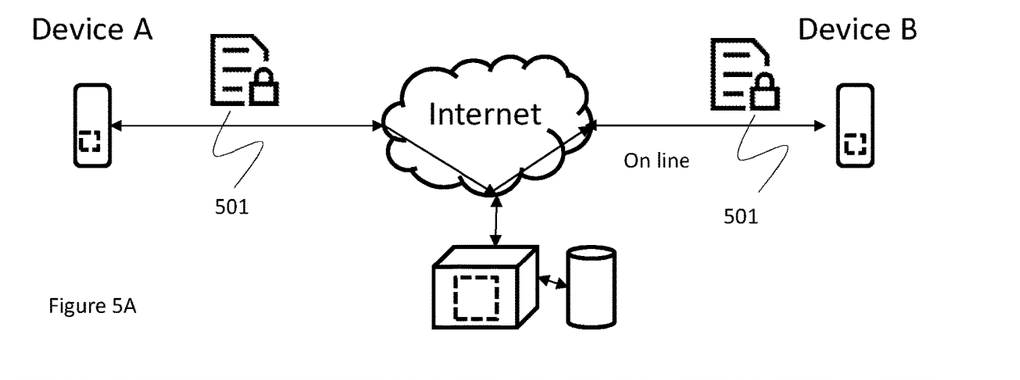
FIG. 5A illustrates conveyance of a message when users A and B are both online.

A shown in FIG. 5A, where the message is a text message (501), and both users A and B are online, the CVPN can receive and convey the message sent by user A to user B.

Figure 5B:
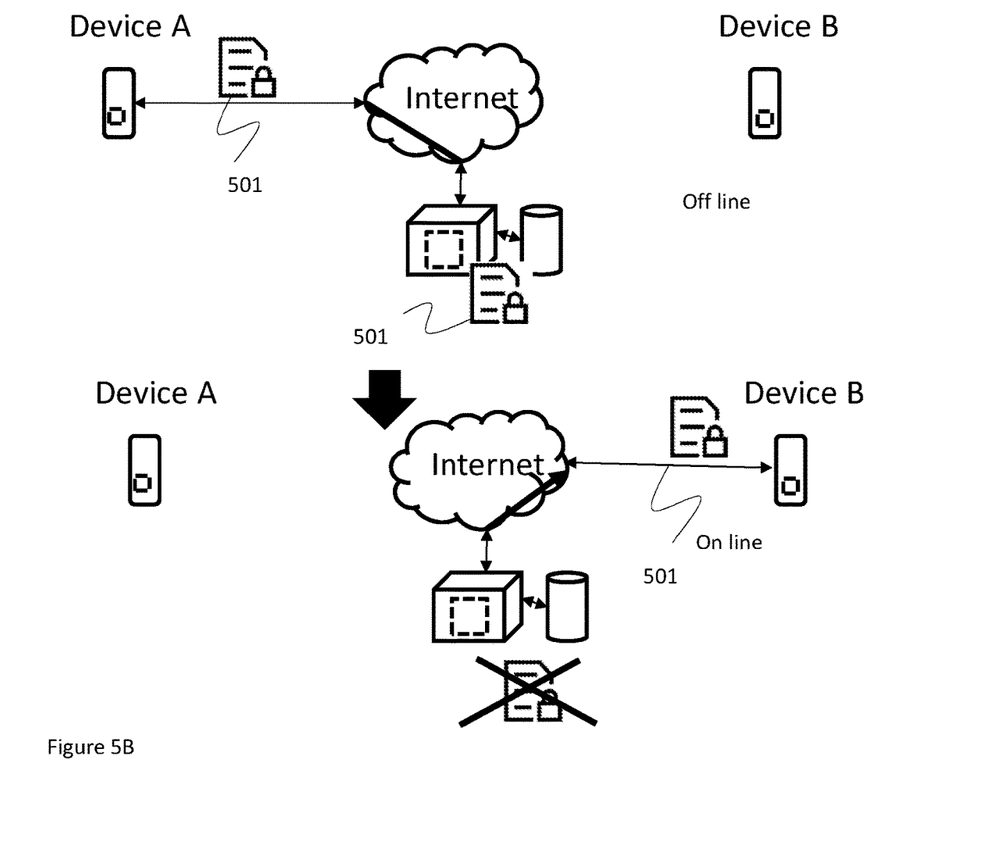
FIG. 5B illustrates the store-and-forward process when recipient B is offline.

As shown in FIG. 5B, where user B is offline, the CVPN can temporarily receive and store the message (501), and, later, when user B is online, the CVPN conveys the temporarily stored message (501) to user B and deletes the temporarily stored message from the CVPN's infrastructure. The same process occurs when the encrypted file to be conveyed is audio or video. That is, if user B is offline, the encrypted file is temporarily stored and, later, forwarded once user B is again online.

Figure 6:
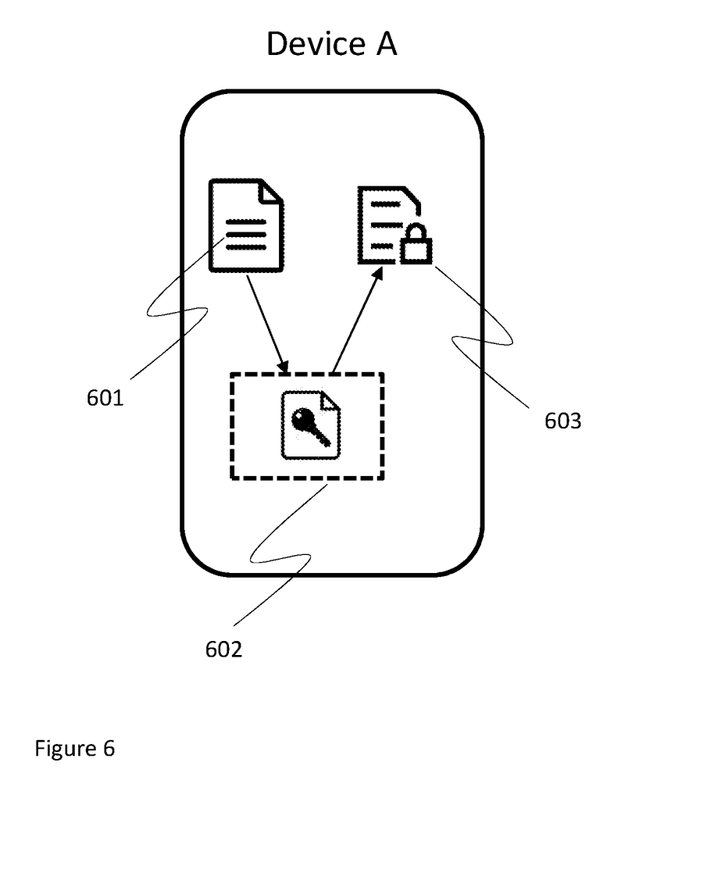
FIG. 6 shows how party A's device, using its stored CVPN application uses user A's secret private key mathematically combined with user B's public key to encrypt a file before conveyance.

As shown in FIG. 6, in preparation for sending a file to user B, user A's device will encrypt the message (601) using a key (602) that is a mathematical combination of user A's secret private key and user B's public key the combination will be known as "secret key" and which is generated through Diffie-Hellman key-exchange method. This is consistent with Diffie-Hellman encryption. The resulting encrypted file is 603, wherein the encryption is consistent AES-256-GCM.

Figure 7:
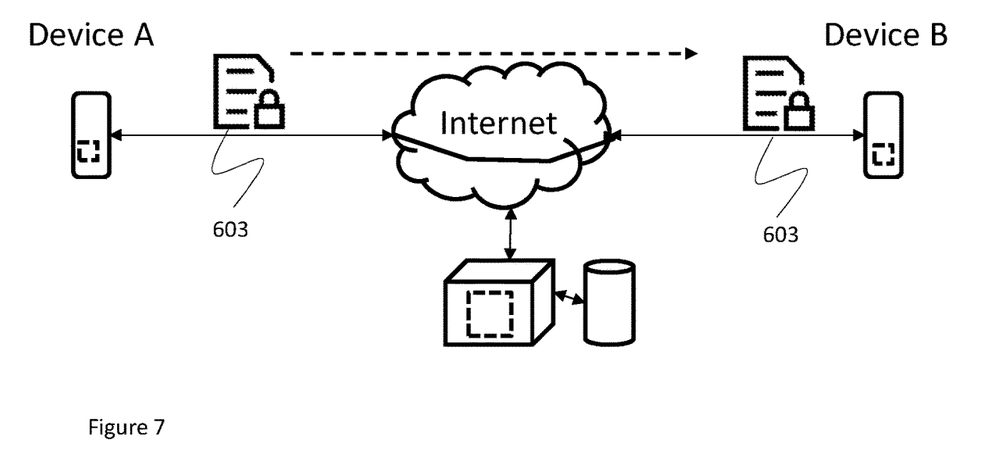
FIG. 7 shows how the file encrypted by A's device is conveyed to B's device via a peer-to-peer communications path established by the CVPN.

As shown in FIG. 7, the encrypted file (603) is conveyed to user B via device A.

Figure 8:
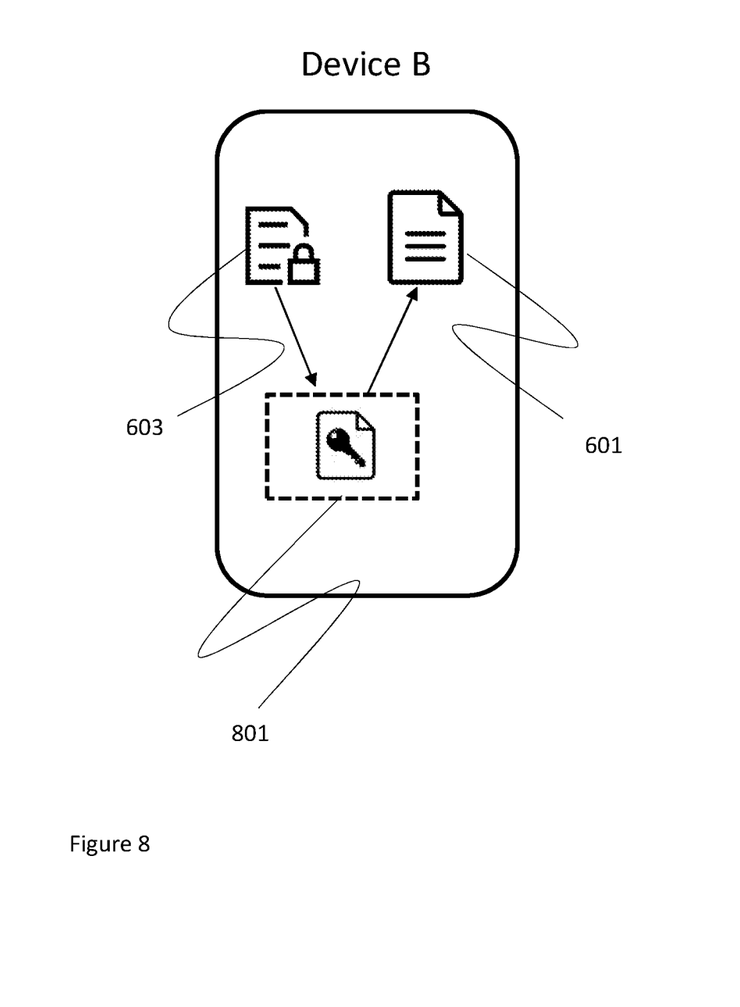
FIG. 8 shows how the encrypted content arriving at B's device is decrypted by a key comprising a mathematical combination of A's public key and B's secret private key.

As shown is FIG. 8, user B's device, having received the encrypted file 603 uses B's secret key (801) to decrypt the file into original format 601. It should be noted that A's secret key can also be used to decrypt the encrypted file 603.

Figure 9:
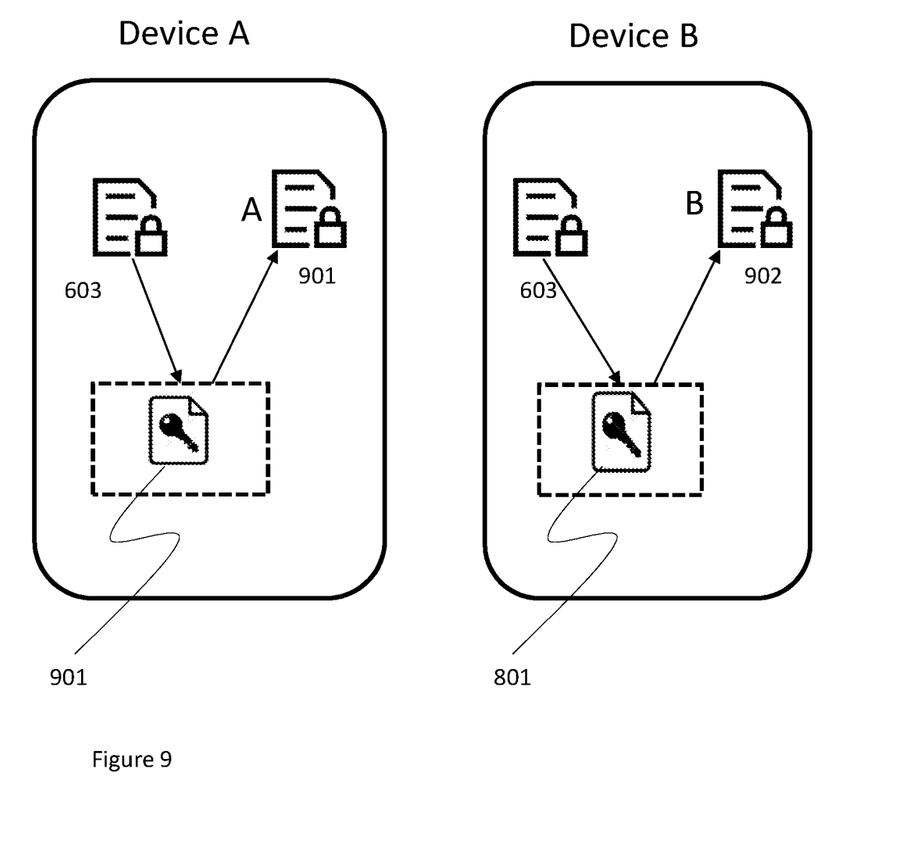
FIG. 9 shows that, after conveying, A's device encrypts the content sent using A's private key, and after viewing, B's device encrypts the content using B's private key.

As shown in FIG. 9, for greater security, user A's device will encrypt the file 603 using A's secret key (901) producing encrypted file 901. Similarly, user B's device will encrypt the file 603 using B's secret key (801) to produce encrypted file 902. It should be noted that these new encrypted files are different from one another and that only A's secret key will decrypt file 901, and only B's secret key will decrypt file 902.

Figure 10:
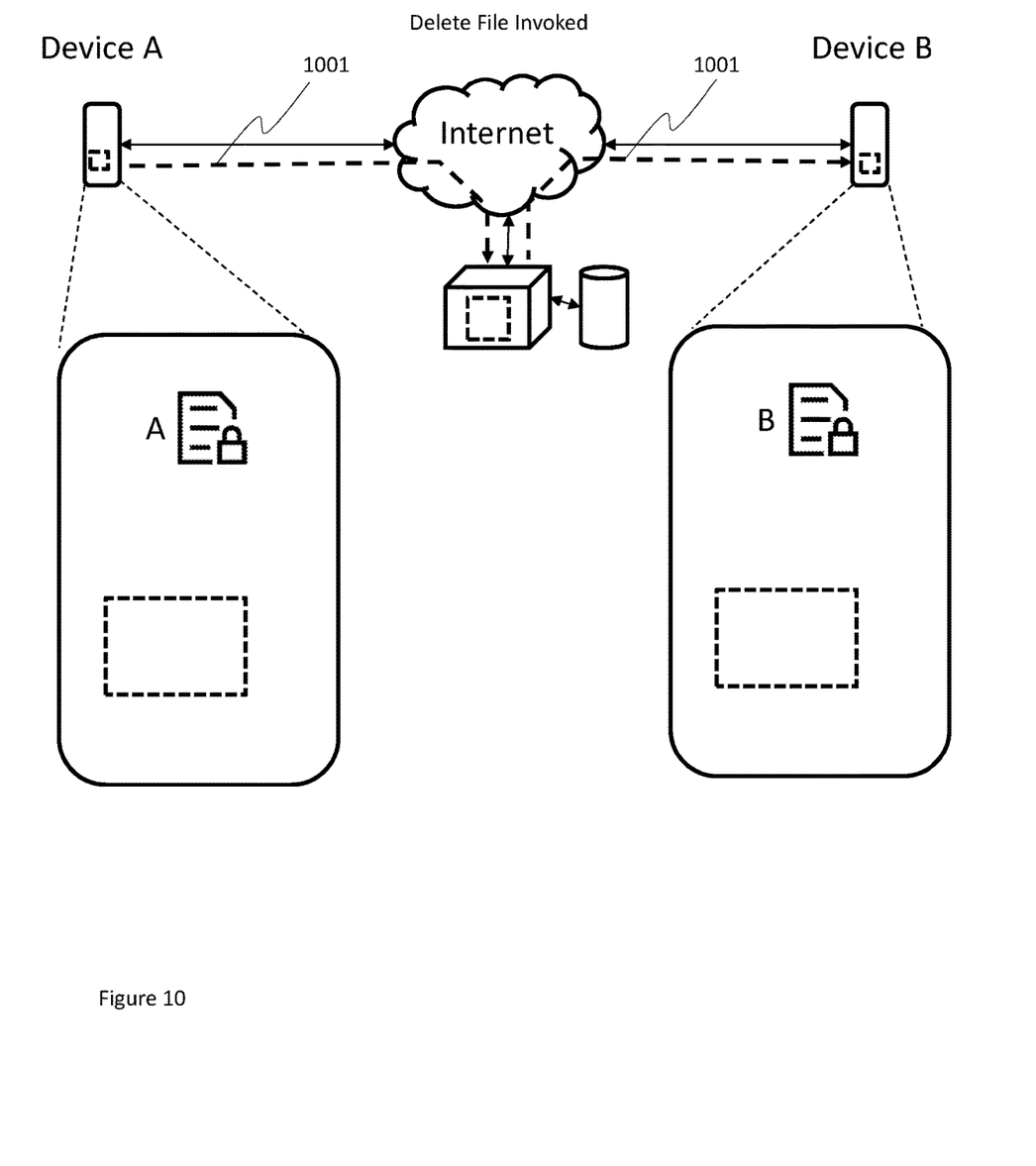
FIG. 10 shows how a file-deletion process is initiated by user A.

As shown in FIG. 10, the CVPN can support file deletions on both ends, that is, in device A and device B. User A may decide it is prudent to delete a file or files previously sent to user B. As such, user A, using device A, invokes a "delete file" command. The CVPN will convey the command to user B's device B. At this point, the CVPN need not be involved in carrying out the file deletion.

Figure 11:
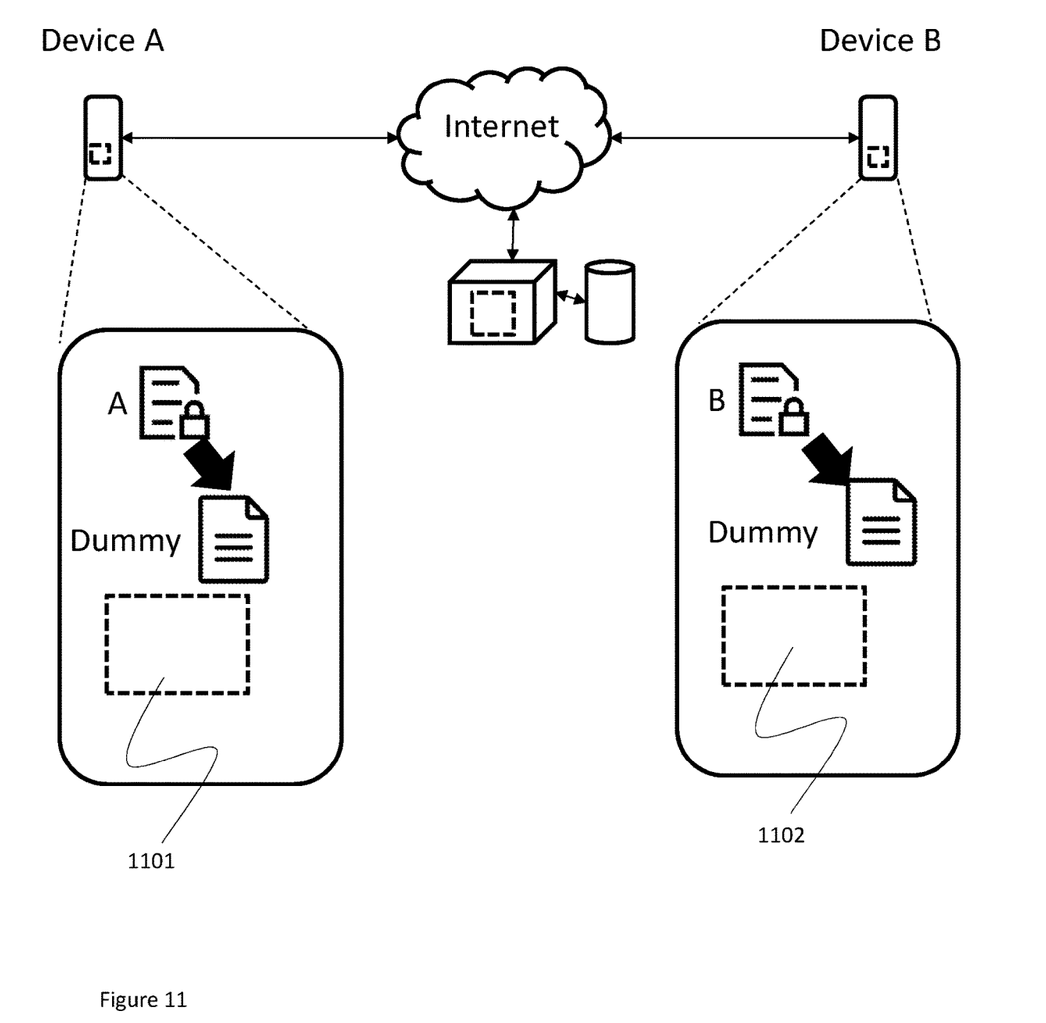
FIG. 11 shows how A's device replaces the encrypted file with a dummy file; and B's device replaces the encrypted file with a dummy file

As shown in FIG. 11, in response to the delete-file command, device A will overwrite the stored encrypted file A with a dummy file of comparable size made up of nonsense characters (1101). Device B will carry out a similar operation overwriting its stored encrypted file with a different dummy file of comparable size made up of nonsense characters (1102).

Figure 12:
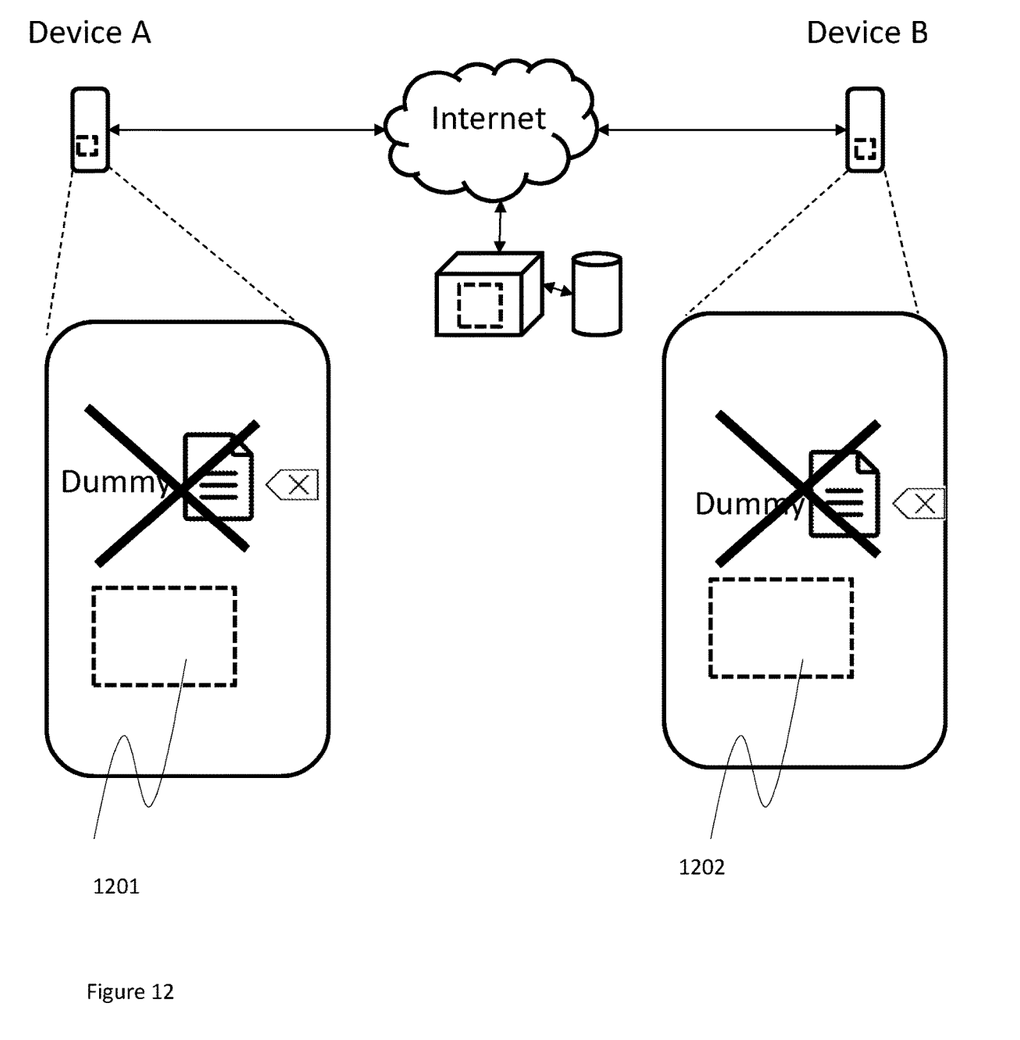
FIG. 12 shows how after replacements by dummy files, the dummy files are then deleted.

As shown in FIG. 12, having essentially replaced the content of the encrypted files with dummy-file content, the device A's CVPN application will delete its dummy file; and device B's CVPN application will delete its dummy file. As noted earlier, even if the content of the dummy files can later be captured, the encrypted file content was eliminated during the overwriting step.

Regarding the delete-file command, it could include a delete-conversation command wherein all files associated with exchanges between user A and user B are similarly overwritten then deleted. Furthermore, all conveyance information associated with the conversational exchanges can also be overwritten and deleted. In this most extreme case, virtually all content and records of a conversation between A and B could be removed.

Note that the figures and descriptions represent one embodiment of this method-of-use invention and should not be read as limiting. Other modes of deleting files, end-to-end, may be supported by the CVPN based on programming. Although the figures and descriptions show that encrypted files are stored on the respective devices, the CVPN could also be programmed to enable its users to store encrypted files in cloud servers so as to protect them should a device be destroyed or stolen.

As described, the initial request for access takes account of the user's system but the UAN and authorized access could later be moved to another user system by making use of the ID and PIN associated with the UAN. For security, the system could be programmed such that only one system associated with a particular UAN can access the CVPN at any time.

The UAN is a multiple-digit number. The most significant digits could be associated with the location of a device seeking access, for example, with the remaining digits generated by a random-number generator. As a practical consideration, a UAN should be at least as large as the worst-case estimate of the number of current authorized users who may seek peer-to-peer communications concurrently.

The invention claimed is:

1. What is claimed is a method of use of a programmable VPN comprising:
   a. receiving from a requester, via a communications network, a request for access to CVPN;
   b. responding to said request comprising:
      requiring submission of a proposed user-identification code composed of alphanumeric characters;
      requiring submission of a proposed multi-digit personal-identification number;
   c. comparing submitted said proposed user-identification code and said proposed personal-identification number to data in a database of issued user-identification codes numbers issued personal-identification numbers:
      if either or both said proposed user-identification code and said proposed personal-identification number are not unique, then repeating steps b and c;
      if both said proposed user-identification code and said proposed personal-identification number are unique, then returning a unique multi-digit user access number to said requester and associating said multi-digit user access number with said unique user-identification code and said unique personal-identification number;
   receiving via the communications network said request for access accompanied by a said unique multi-digit user access number;
   allowing access if said unique multi-digit user access number is registered in said database of said issued user-identification codes and said issued personal-identification numbers;
   receiving from said requester, having access, a second unique multi-digit user-access number;
   creating a communications path, via the communications network, between said requester and a holder of said second unique multi-digit user access number;
   receiving from said requester an encrypted file to be conveyed to said holder of said second unique multi-digit user-access number wherein said encrypted file has been encrypted using a private key from said requester and a public key from said holder of said second unique multi-digit user access number in accordance with Diffie-Hellman encryption processes;
   conveying via said communications path said encrypted file to said holder of said second unique multi-digit user access number;
   saving said encrypted file on said requester's access device;
   saving said encrypted file on said holder of said second unique multi-digit user-access number on said holder's access device;
   receiving from said requester, wishing to delete a file, a delete-file command;
   conveying by said CVPN, via the communications network, said delete-file command to said access device of said holder of said second unique multi-digit user-access number;
   overwriting, by said access device of said requester, said encrypted file, denoted in said delete-file command, and stored on said access device of said requester, by a file comprising random alphanumeric characters;
   deleting overwritten file from said access device of said requester;
   overwriting, by said access device of said holder of said second unique multi-digit user-access number, said encrypted file, by a file comprising random alphanumeric characters; and
   deleting overwritten file from said access device of said holder of said second unique multi-digit user-access number.

2. A method claim as in claim 1 further comprising:
   decrypting of said encrypted file by said holder of said second unique multi-digit user access number using said holder's secret private key in accordance with Diffie-Hellman decryption processes.

3. A method claim as in claim 2 further comprising:
   displaying by said holder's access device decrypted file of said encrypted file; and
   deleting said decrypted file while retaining said encrypted file once displayed file is closed.

* * * * *